（12） United States Patent
Oliver et al.

(10) Patent No.: US 8,260,054 B2
(45) Date of Patent: Sep. 4, 2012

(54) METHODS FOR MATCHING IMAGE-BASED TEXUAL INFORMATION WITH REGULAR EXPRESSIONS

(75) Inventors: Jonathan James Oliver, Kew (AU); Lili Diao, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 983 days.

(21) Appl. No.: 12/235,543

(22) Filed: Sep. 22, 2008

(65) Prior Publication Data

US 2010/0074534 A1    Mar. 25, 2010

(51) Int. Cl.
*G06K 9/62* (2006.01)

(52) U.S. Cl. .......................... 382/187; 382/219; 382/226

(58) Field of Classification Search .................. None
See application file for complete search history.

(56) References Cited

U.S. PATENT DOCUMENTS

| | | | | |
|---|---|---|---|---|
| 5,151,950 A | * | 9/1992 | Hullender | 382/187 |
| 6,018,735 A | * | 1/2000 | Hunter | 1/1 |
| 2003/0138144 A1 | * | 7/2003 | Lynggaard | 382/181 |
| 2010/0128985 A1 | * | 5/2010 | El-Sana et al. | 382/189 |

* cited by examiner

*Primary Examiner* — Brian P Werner
(74) *Attorney, Agent, or Firm* — IPSG, P.C., Intellectual Property Law

(57) ABSTRACT

A method for matching an image-form textual string in an image to a regular expression is disclosed. The method includes constructing a representation of the regular expression and generating a candidate string of characters from the image-form textual string. The method further includes ascertaining whether there exists a match between the image-form textual string and the regular expression, the match is deemed achieved if a probability value associated with the match is above a predetermined matching threshold.

19 Claims, 7 Drawing Sheets

 INPUT (1): Image

 INPUT (2): Regular Expression

 Step 1 – Splitting the Image into character-blocks

 Step 2 – Calculate probability that character-blocks are various letter/digits/symbols

 Step 3 – [optional] Character-blocks which were hard to identify may be grouped together or split apart into multiple character-blocks

 Step 4 – Form a string from the character blocks which consists of candidate characters and probabilities associated with those characters

 Step 5 – Process the string formed in Step 4, use the Modified-Aho-Corasick algorithm to calculate the probability that a match to the regular expression has been found. If a sequence of character blocks has a probability of matching the regular expression above a threshold, then it outputs that the Regular Expression was matched in the image.

 OUTPUT: Whether the Regular Expression can match the Image

Example Inputs:

RE: (a|b)*aab  
S = c: 100  
a: 100  
a: 100  
b: 100  
d: 100  
b: 100  
a: 50    @: 50  
b: 50    6: 50  
b: 50    6: 50  
g: 100

FIG. 4

Initialize State Table to

| State A | 100 |
|---------|-----|

Construct a DFA from RE (using standard techniques).

Processes each line of S in the following way

For each candidate character on the line {
    Let c be the candidate character
    Let p be the associated probability for c
    Let NewState Table be NULL
    For each state in the state table {
        Let CurrState be the state in the state table
        Let Currp be associated probability in the state table
        Let NextState be the next state in DFA which has a arc starting at state CurrState labeled c
        Let Newp = Currp * p
        Add a row to NewState Table = (NextState, Newp)
    }

Collapse multiple rows in NewState Table to a single row if the state entry is the same (add the associated probabilities).

[Optional Step] delete rows in NewState Table if the associated probability if below a threshold. If this is done, then it is necessary to renormalize the associated probabilities to add up to 100 percent.

State Table = NewState Table

If we have reached a endstate in StateTable with an associated probability which is high enough, then we record that we have matched RE in the image.

FIG. 5

602 Initialize

| State A | 100 |

604 After processing c : 100

| State A | 100 |

606 a : 100

| State B | 100 |

608 a : 100

| State B | 100 |

610 b : 100

| State D | 100 |

612 d : 100

| State A | 100 |

614 b : 100

| State C | 100 |

616 a : 50   @ : 50

| State B | 50 |
| State A | 50 |

618 b : 50   6 : 50

| State D | 25 |
| State C | 25 |
| State A | 50 |

620 b : 50   6 : 50

| State E | 12.5 |
| State A | 50 |
| State C | 37.5 |

At this stage we have reached state E and have matched the regular expression in the image with probability 12.5%

622 g : 100

| State A | 100 |

FIG. 6

METHODS FOR MATCHING IMAGE-BASED TEXUAL INFORMATION WITH REGULAR EXPRESSIONS

BACKGROUND OF THE INVENTION

A regular expression is sequence of pattern-defining characters that has long been employed for identifying strings of text. For example, the regular expression, [0-9] [0-9] [0-9]-[0-9] [0-9]-[0-9] [0-9] [0-9] [0-9] may be employed to identify social security numbers in the standard format (such as 333-22-4444). In order to determine if a given regular expression matches a string of text, string searching algorithms may be implemented.

One string searching algorithm commonly implemented is the Aho-Corasick algorithm. The Aho-Corasick algorithm, which is typically employed to determine whether the string contains a match to the regular expression, generally is a two step process. The first step in the process converts the regular expression into a Deterministic Finite State Automaton (DFSA). The second step in the process utilizes the DFSA constructed in the first step to linearly scan the string in order to identify an exact match to the regular expression. The Aho-Corasick algorithm is well-known and is widely available for review online and will not be repeated here.

Generally speaking, it is well known, that it is possible to employ a string searching algorithms such as the Aho-Corasick algorithm to identify all occurrences of a regular expression when matching Latin-script, typewritten text. However, it is significantly more difficult to identify strings of text which may appear in an image form, e.g., in an image. An example of an image that includes a string of text in image form may be an employee's W-4 form that has been filled out by hand-printing and then scanned in for document retention.

One approach implemented for identifying strings of text in an image that contains an image version of that string of text involves first performing Optical Character Recognition (OCR) on the image and then performing a string searching algorithm to match the regular expression(s) in the OCRed text. However, this approach is generally not deemed to be sufficiently accurate, efficient or workable for text other than neat type-N % Titen text because the OCR approach tends to generate many recognition errors per page. The recognition errors degrade the performance of any subsequent matching process.

Consider the situation wherein, for example, an OCR engine is applied to an image of the hand-printed string 012-34-5678. In this example, performing OCR may result in the recognized string "OI2-34-S678" where the digit "0" is recognized as the letter "O", the digit "1" as the uppercase "I", and the digit "5" as the letter "S". Once the OCR has been performed, a string searching algorithm may then be employed on the OCR result. Because the string searching algorithm performs a linear scan on the OCR result, an erroneously recognized string of text will result in a match failure or an erroneous match.

In view of the foregoing, improved techniques for recognizing textual strings that appear in image forms are desired.

SUMMARY OF INVENTION

The invention relates, in an embodiment, to a computer-implemented method for matching an image-form textual string in an image to a regular expression. The method includes constructing a representation of the regular expression and generating a candidate string of characters from the image-form textual string. The method further includes ascertaining whether there exists a match between the image-form textual string and the regular expression, the match is deemed achieved if a probability value associated with the match is above a predetermined matching threshold.

In another embodiment, the invention relates to a computer-implemented method for matching an image-form textual string in an image to a regular expression. The computer-implemented method comprising of constructing a representation of the regular expression, the representation having at least a first state representing uncertainty whether the image-form textual string matches the regular expression and a success state representing a successful match between the image-form textual string and the regular expression.

The computer-implemented method further comprising of generating a candidate string of characters from the image-form textual string, the candidate string of characters including a plurality of candidate characters occupying a plurality of character positions, each candidate character of the plurality of candidate characters associated with a respective recognition probability. Finally, the computer-implemented method comprising of ascertaining whether there exists a match between the image-form textual string and the regular expression by applying candidate string of characters character position-by-character position against the representation, whereby processing a candidate character of the candidate string results in a next state and a probability value. The match is achieved when a given next state associated with a given candidate character of the plurality of characters computed during the applying is the success state of the representation and a probability value associated with the given next state is above a predetermined matching threshold.

These and other features of the present invention will be described in more detail below in the detailed description of the invention and in conjunction with the following figures.

BRIEF DESCRIPTION OF THE DRAWINGS

The present invention is illustrated by way of example, and not by Ivan of limitation, in the figures of the accompanying drawings and in which like reference numerals refer to similar elements and in which:

FIG. 1B shows, in accordance Keith an embodiment of the invention, an overall processing logic diagram for matching a image-form textual string in an image with a regular expression.

FIG. 2 shows, in accordance an embodiment of the invention, an example of a character-block.

FIG. 3 shows, in accordance an embodiment of the invention, an example of two separate character-blocks that may be combined into one character-block.

FIG. 4 shows, in accordance with an embodiment of the invention, example inputs for the improved string search algorithm (ISSA).

FIG. 5 shows, in accordance With an embodiment of the invention, the steps of the improved string search algorithm (ISSA) procedure.

FIG. 6 shows, in accordance with an embodiment of the invention, the improved string search algorithm (ISSA) procedure in operation using the inputs of FIG. 4.

DETAILED DESCRIPTION OF EMBODIMENTS

Figure 1A:
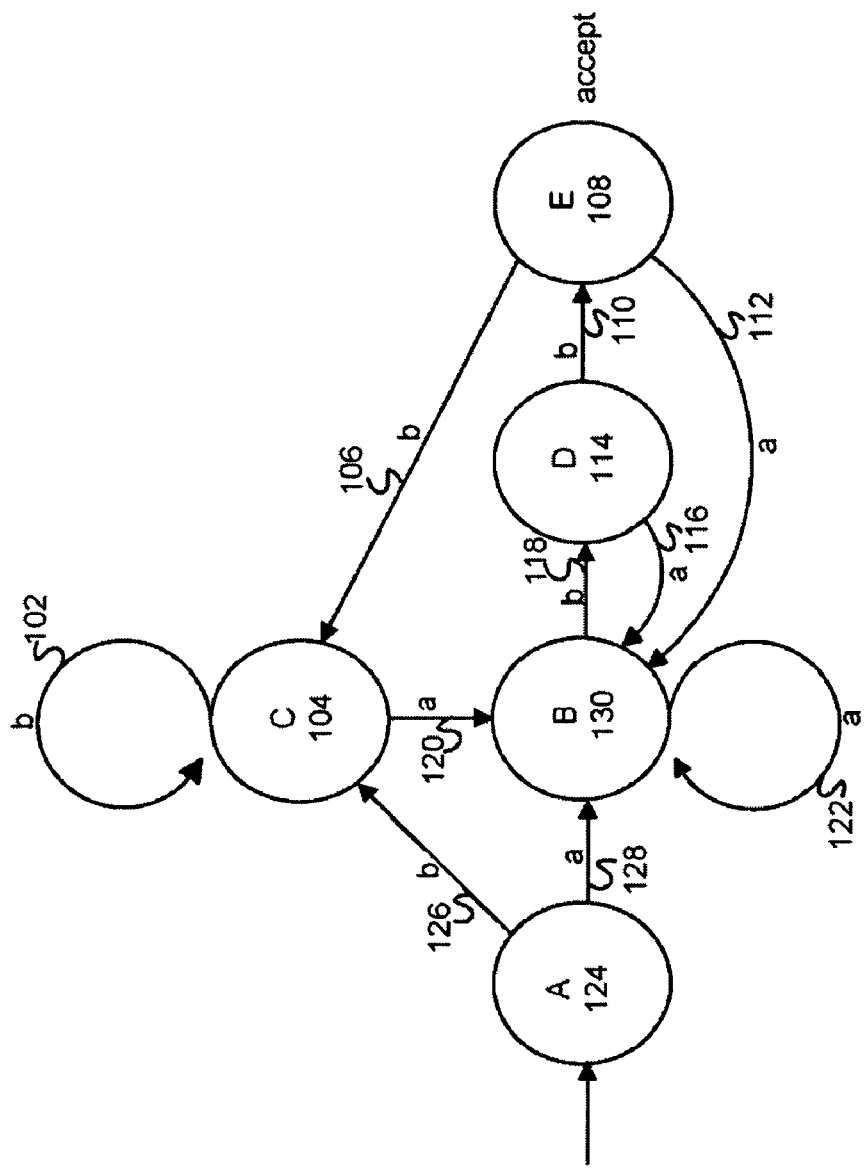
FIG. 1A shows a Deterministic Finite State Automaton (DFSA) representation of an example regular expression.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to avoid unnecessarily obscuring the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may, include a combination of a computer/computing device and dedicated/programmable circuits adapted for the various tasks pertaining to embodiments of the invention.

Embodiments of the invention relate to methods for matching an image-form textual string to regular expressions to arrive at a match result and optionally a match percentage. In an embodiment, a computer-implemented method for matching an image-form textual string in an image to a regular expression is proposed whereby a representation of the regular expression is obtained, and a candidate string of characters is generated from the image-form textual string. The method further includes ascertaining whether there exists a match between the image-form textual string and the regular expressions the match is deemed achieved if a probability value associated with the match is above a predetermined matching threshold.

In one or more embodiments, a method is proposed whereby not only the candidate characters of the candidate string and the regular expression(s) are processed by an improved string searching algorithm (ISSA) but the ISSA also takes into account the probability data associated with the recognition of the candidate character(s). Furthermore, the ISSA is configured to handle not only a candidate string having a singular candidate character for each of the character position of the candidate string. Instead, the improved string search algorithm (ISSA) also takes into account alternative candidate characters for one or more of the character positions of the candidate string, as well as their relative recognition probabilities. Still further, the ISSA is configured to handle multiple states during the evaluation of candidate characters at any given character position.

To facilitate discussion, an example is provided herein to clarify the concepts of candidate string, character position, candidate character and recognition probability associated with the candidate characters. In the first example, consider a candidate string having four character positions. The candidate string thus has four possible characters in four possible character positions (e.g., aaaa, aaab, aabb, abcd, mnop, defg, etc.). In the previous example, each of the first, second, third, and fourth character positions is associated with a singular character. Thus, for the candidate string abcd, the first character position is associated with the letter "a", the second character position is associated with the letter "b", the third character position is associated with the letter "c", and the fourth character position is associated with the letter "d".

Now consider the situation wherein each of the character positions may be associated with more than one character. An example of such a candidate string is "a/g, c/d/f, m/n, x/y". In this example, for the candidate string "a/g, c/d/f, m/n, x/y", the first character position is associated with either the letter "a" or the letter "g", the second character position is associated with either the letter "c" or the letter "d" or the letter "f", the third character position is associated with either the letter "m" or the letter "n", and the fourth character position is associated with either the letter "x" or the letter "y". As can be seen in this example, multiple candidate characters may be associated with a character position of the candidate string.

Now consider the situation wherein each candidate character of the multiple candidate characters associated with a character position of the candidate string is also associated with a recognition probability. An example of such a candidate string is "a (50)/g(50), c(70)/d(20)/f(10), m(90)/n(10), x(40)/y(60)". In this example, for the candidate string "a(50)/g(50), c(70)/d(20)/f(10), m(90)/n(10), x(40)/y(60)", the first character position is associated with either the letter "a" or the letter "g". Further, the character "a" has a recognition probability (i.e., the probability that the character being letter "a") of 50% and the character "b" has a recognition probability (i.e., the probability that the character being letter "b") of 50%. Likewise, the second character position is associated with either the letter "c" or the letter "d" or the letter "f". Further, the character "c" has a recognition probability (i.e., the probability that the character being letter "c") of 70% and the character "d" has a recognition probability (i.e., the probability that the character being letter "d") of 20% and the character "f" has a recognition probability (i.e., the probability that the character being letter "f") of 10%.

The utilization of multiple candidate characters for each character position as well as the recognition probability data render the match process highly efficient. Still further, the improved string search algorithm (ISSA) is configured to handle multiple states during the evaluation of candidate characters at any given character position. The multi-state capability also renders the match process robust to errors in the scanning process and/or artifacts on the page.

The features and advantages of the invention may be better understood with reference to the figures and discussions that follow.

FIG. 1A shows a Deterministic Finite State Automaton (DFSA) representation of an example regular expression RE=(a/b)*aab. The DFSA representation includes at least a start state (124) where a match is still uncertain and an end state (108) representing a match success. The conversion of a regular expression to a DFSA is well known in the art and will not be belabored herein.

FIG. 1B shows, in accordance with an embodiment of the invention, an overall processing logic diagram for matching an image-form textual string in an image with a regular expression or a set of regular expressions. As seen in FIG. 1B, in step 152, an image containing the image-form textual string is inputted. In step 154, a regular expression or a set of regular expressions is inputted. In this example, only a single regular expression is discussed to simplify the example although multiple regular expressions may also be employed. As discussed, the regular expression may be represented by a DFSA, as shown in FIG. 1. Although only one regular expression is discussed in the examples herein, multiple regular expressions may be accommodated. When multiple regular expressions need to be evaluated, the multiple regular expressions may be reduced to a single DFSA and this DFSA can be used to identify matches following the methodology discussed herein.

In step 156, the pixels of the image are split into character-blocks by utilizing traditional approaches well know in the art. There are a number of steps which can be used in combination to identify character blocks such as (i) gray-scaling some or all of the image, (ii) selecting a threshold for pixel values to identify, possible letter components, (iii) tracing around touching (or proximate) pixels identified as belong to a group (iv) finding pixels not belonging to an existing character-block and creating new character-blocks. Various combinations and sequences of techniques such as these can be employed to split a image into character blocks. Other approaches for splitting an image into character blocks are known in the art and may be employed equally with other steps of embodiments of the present invention.

Figure 2:
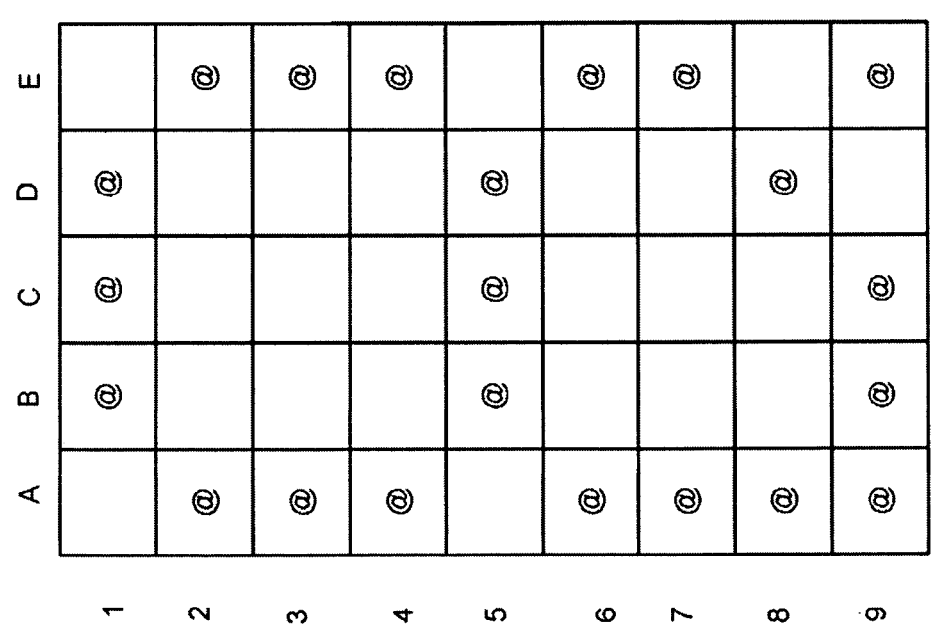

An example of a character-block can be seen in FIG. 2 in which a character-block for the number 8 is shown.

In step 158, the probability that the character-blocks are various letters, digits, and symbols is calculated. Calculating or the probability may be done by handcrafted code or using statistical approaches. For example, one approach for calculating the probability ma) utilize a Support Vector Machine (SVM). In conventional 2-class classification, a SVM employing linear kernel can be trained up with support vectors and optimized parameters. Using mathematical conversion, the learning model can be converted to numerical evaluation of features. If the sum of the scores from features from an examined object exceed a threshold, the examined object is deemed to belong to a certain class. For probability estimation for which letters relate to an extracted char-block, it is a multi-class classification problem. The multi-class classification problem can be split to multiple 2-class classification problems. Each 2-class classification problem reflects a test for a possible letter by calculating the sum of the numerical evaluations for all hit features. The sum for the letter may be deemed "SVM score", which (after normalization) can be interpreted to represent the probability of that letter given a char-block. The letter(s) with the highest SVM score(s) can be selected as the candidate letter(s) for an extracted char-block.

In the example of FIG. 2, the character-block may, for example, be calculated to have a recognition probability of 80% of being number 8, or 15% of being the letter "B" or 5% of being the ampersand symbol "&".

In optional step 160, character-blocks that are hard to identify may be grouped together or split apart into multiple character blocks. Suppose, for example, that there exists an image that includes a handwritten social security number, 239-53-2221, in image form. Further, suppose that the last number "2" and the number "1" are almost touching or actually touching one another. In this case, one character-block may have been created for both the last number 2 and the number 1. Since the combined character block was hard to recognize (e.g., low probability of recognition for any character), this character-block may be split apart to form two separate character-blocks, one to represent the number "2" and one to represent the number "1", in order facilitate recognition with improved recognition probabilities.

Figure 3:
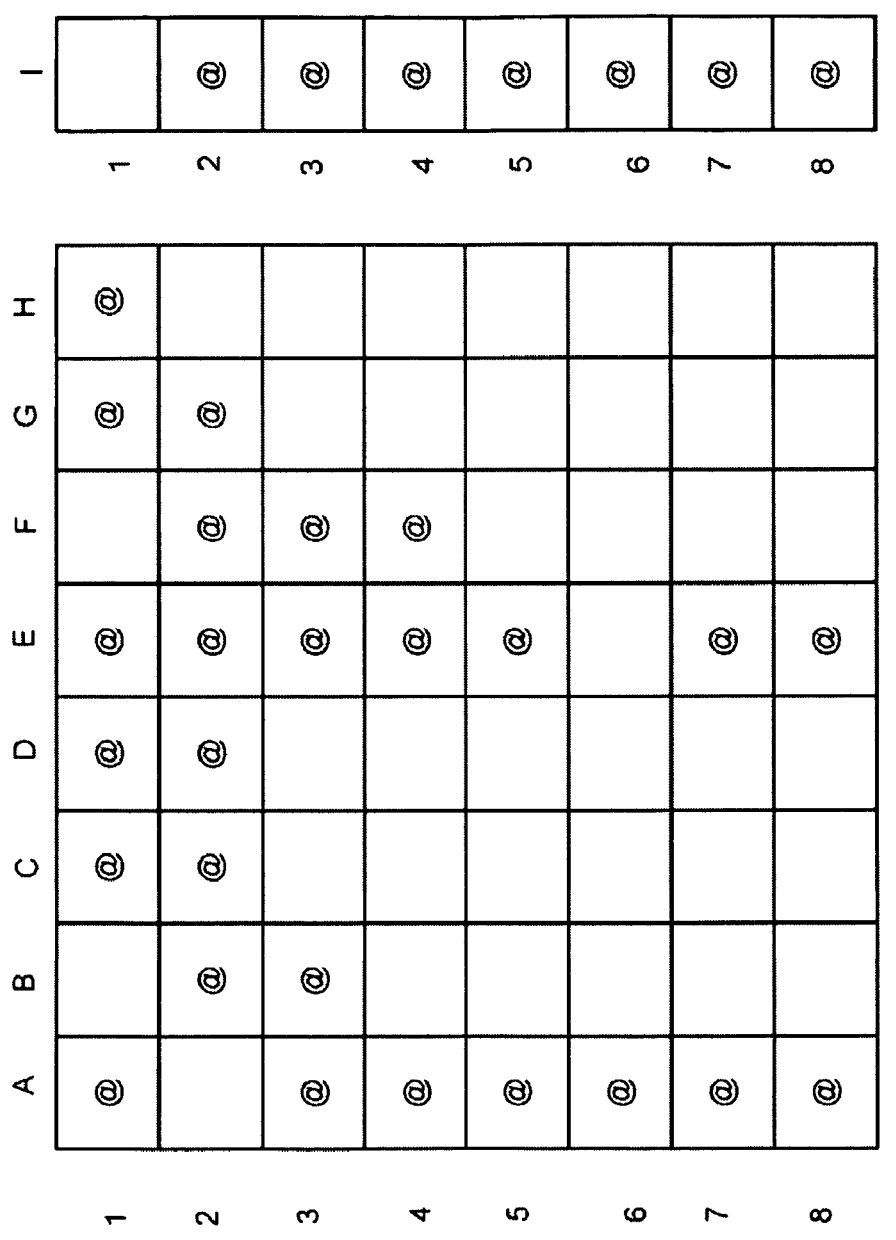

Another example may be seen in FIG. 3, which shows two separate character-blocks that were split erroneously due to the presence of a space (possibly due to scanner error or sloppy handwriting) between pixels that are supposed to be adjacent. Since the individual character blocks were hard to recognize (e.g., low probability of recognition for any character), combining the two character-blocks into one character-block may increase the likelihood that a character would be recognized with a greater recognition probability. For example, by combining the two character-blocks in FIG. 4, the character "M" may be recognized with a fairly high degree of recognition probability.

In step 162, a string from the character-blocks, which include candidate characters and the recognition probabilities associated with those characters, is formed.

In step 164, the string formed in step 162 is then processed by employing an improved string search algorithm (ISSA) to calculate the probability that a match between the candidate string to the regular expression has been found. Step 164 will be discussed in greater detail in FIG. 4 through FIG. 9.

In Step 216, if the string from the character-blocks has a probability, of matching the regular expression above a predefined threshold, then a match is deemed to have been made. In this case, the output is the determination that a match has been made, along With the match probability. However, if the match probability is below the predefined threshold or if the evaluation of the candidate string results in no match, the output is the determination that there has been no match.

It should be noted that steps 158, 160, and 162 may be implemented in a difference sequences depending on the application.

FIG. 4 shows, in accordance with an embodiment of the invention, example inputs for the improved string search algorithm (ISSA) as briefly discussed in step 164 of FIG. 1B. FIG. 4 shows an input to be the example regular expression RE=(a/b)*aab.

FIG. 4 also shows an input candidate string S, which represents a string of candidate characters and probabilities associated with those characters. In the example of FIG. 4, each line of string S is equal to a character position. As an example, the first character position shows the letter "c" to have a recognition probability of 100%. As another example, there is shown a character position line in which the character "a" has a recognition probability of 50% and the symbol @ has a recognition probability of 50%. For each character position, the sum of recognition from candidate characters associated with that character position is 100%.

FIG. 5 shows, in accordance with an embodiment of the invention, the steps of the improved string search algorithm (ISSA) procedure. With the matched candidate string extracted from identified char-blocks, the procedure ascertains if there are Regular Expressions matched. The procedure in FIG. 5 can be summarized as follows:

1. It generate a DFSA from the regular expression (or regular expressions) that is of interest. Each state can have an associated probability value. The Initial probability value for the start state is set to 100%.

2. Process the string using the DFSA, one letter after another and do all possible state transitions according to input letters. If a given character position has more than one candidate character, process all candidate characters for that character position before proceeding to the next character position. Proceed character position-by-character position.

2a. Updating the probability value for the transited state by multiplying the probability value of the input letter (candidate character) and the probability value of the preceding state. (The sum of probability values for all different transited states is 100%.)

2b. If the input letter is unacceptable to the DFSA (such as when there is no valid next state given the preceding state and the input candidate character), the state would be transited to the start state.

2c. If an End state appears at the transited states, the probability value is checked against a predetermined match threshold. If the probability value associated with the transited state exceeds the predetermined match threshold, the regular expression is deemed found in the candidate string.

2d. If an End state is not reached after all candidate characters of the candidate string is processed, the regular expression is deemed to be not found in the image.

The steps or FIG. 5 may be better understood with the example of FIG. 6 herein. FIG. 6 shows, in accordance with an embodiment of the invention, the improved string search algorithm (ISSA) procedure in operation using the inputs of FIG. 4.

Consider the situation wherein the input candidate string S is equal to that of FIG. 4 and the regular expression is equal to (a/b)*aab, which is also represented by the DFSA of FIG. 1A.

In a first step 602, the initial state is set to State A at 100% probability.

In step 604, the candidate character "c" having 100% recognition probability is processed. With reference to the DFSA constructed in FIG. 1A, since current state is A (124) and the candidate character being processed is "c" having 100% recognition probability, then the next state would be state A (124) at 100% (100%×100%=100%) probability because the candidate character "c" does not trigger the transition to another valid state according to the DFSA of FIG. 1A. The current state now is state A (124) at 100% probability.

In step 606, the candidate character "a" having 100% recognition probability is processed. Using the DFSA constructed in FIG. 1A, since current state is A (124) and the candidate character being processed is "a" having 100% recognition probability. then the next state (see transition 128) would be state B (130) at 100% (100%×100%=100%) probability. The current state now is state B (130) at 100% probability.

In step 608, the candidate character "a" having 100% recognition probability is processed. Using the DFSA constructed in FIG. 1A, since current state is B (130) and the candidate character being processed is "a" having 100% recognition probability, then the next state (see transition 122) would be state B (130) at 100% (100%×100%=100%) probability. The current state now is state B (130) at 100% probability.

In step 610, the candidate character "b" having 100% recognition probability is processed. Using the DFSA constructed in FIG. 1A, since current state is B (130) and the candidate character being processed is "b" having 100% recognition probability, then the next state (see transition 118) would be state D (114) at 100% (100%×100%=100%) probability. The current state now is state D (114) at 100% probability, In step 612, the candidate character "d" having 100% recognition probability is processed. Using the DFSA constructed in FIG. 1A, since current state is D (114) and the candidate character being processed is "d" at 100% probability, then the next state would be state A (124) at 100% (100%×100%=100%) probability because the candidate character "d" does not trigger a valid transition to another state from state D. The current state now is state A (124) at 100% probability.

In step 614, the candidate character "b" having 100% recognition probability is processed. Using the DFSA constructed in FIG. 1A, since current state is A (124) and the candidate character being processed is "b" having 100% recognition probability, then the next state (see transition 126) would be state C (104) at 100% (100%×100%=100%) probability. The current state now is state C (104) at 100% probability.

In step 616, the candidate character "a" having 50% recognition probability is processed. Using the DFSA constructed in FIG. 1A, since current state is C (104) at 100% probability and the candidate character being processed is "a" having a 50% recognition probability, then the next state (see transition 120) would be state B (130) at 50% (50%×100%=50%) probability.

Also, in step 616, the candidate character "@" having 50% recognition probability is processed. Using the DFSA constructed in FIG. 1A, since the current state is C (104) at 100% probability and the candidate character being processed is "@" having 50% recognition probability, then the next state would be state A (124) at 50% (50%×100%=50%) probability because the candidate character "@" does not trigger transition to another valid state from state C (and thus necessitating a return to the initial state A). Therefore, the current state now is both state B (1 30) at 50% probability and state A (124) at 50% probability.

In step 618, the candidate character "b" having 50% recognition probability is processed. Using the DFSA constructed in FIG. 1A, since current state is B (130) at 50% probability and state A (124) at 50% probability, and the candidate character being processed is "b" having 50% recognition probability, then the next state would be state D (114) at 25% (50%×50%=25%) probability and state C (104) at 25% (50%×50%=25%) probability.

Also, in step 618, the candidate character "6" having 50% recognition probability is processed. Using the DFSA constructed in FIG. 1A, since the current state is B (130) at 50% probability and state A (124) at 50% probability and the candidate character being processed is "6" having 50% recognition probability, then the next states would be state A (124) at 50% ((50%×50%) +(50%×50%) =50% ) probability because the candidate character "6" does not trigger a valid transition to another state from either state B (130) or state A (124). Therefore, the current state now includes state D (114) at 25% probability, state C (104) at 25% probability, and state A (124) at 50% probability.

In step 620, the candidate character "b" having 50% recognition probability is processed. Using the DFSA constructed in FIG. 1A, since current states are state D (114) at 25% probability, state C (104) at 25% probability, and state A (124) at 50% probability and the candidate character being processed is "b" having 50% recognition probability, then the next states would be state E (108) at 12.5% (50%×25%=12.5%) probability (see transition 110), and state C (104) at 37.5% ((50%×50%)+(50%×25%)=37.5%) probability (see transition 102 and transition 126 from state C and state A respectively).

Also, in step 620, the candidate character "6" having 50% recognition probability is processed. Using the DFSA constructed in FIG. 1A, since the current states are state D (114) at 25% probability, state C (104) at 25% probability, and state A (124) at 50% probability and the candidate character being processed is "6" having 50% recognition probability, then the next states would be state A (124) at 50% ((50%×25%)+(50%×25%)+(50%×50%)=50% ) probability because the candidate character "6" does trigger a valid transition to another state from either state D (114), state C (104), or state A (124).

Therefore, the current state now includes state E (108) at 12.5% probability, state C (104) at 37.5% probability, and state A at 50% probability. In accordance with the DFSA of FIG. 1A, since state E is the acceptance state, a match is deemed to have been made with 12.5% probability.

In step 622, the candidate character "g" having 100% recognition probability is processed. Since the candidate character "g" does not trigger a valid transition to any other state from either current state E, current state A, or current state C, the next state is state A at 100% probability.

As can be appreciated from the foregoing, embodiments of the invention utilize multiple candidate characters for each character position of the candidate string as well as the recognition probability data associated with each candidate character in the matching process. Further, embodiments of the invention permit the existence of multiple states in the evaluation of any given candidate character. By utilizing this additional data in conjunction with the improved string search algorithm (ISSA), a highly efficient matching method for matching image-based textual information with regular expressions is achieved.

While this invention has been described in terms of several preferred embodiments, there are alterations, permutations, and equivalents, which fall within the scope of this invention. For example, although DFSA is employed to facilitate discussion. the representation may also be in the form of non-deterministic finite state automaton (NFSA) or any other suitable representation as can be appreciated by those skilled in the art. Thus although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for matching an image-form textual string in an image to a regular expression, comprising:
    constructing a representation of said regular expression;
    generating a candidate string of characters from said image-form textual string;
    ascertaining whether there exists a match between said image-form textual string and said regular expression, said match is deemed achieved if a probability value associated with said match is above a predetermined matching threshold; and
    said representation has at least a first state representing uncertainty whether said image-form textual string matches said regular expression and a success state representing a successful match between said image-form textual string and said regular expression and wherein said generating said candidate string of characters including a plurality of candidate characters occupying a plurality of character positions, each candidate character of said plurality of candidate characters associated with a respective recognition probability and wherein said ascertaining includes applying said candidate string of characters character position-by-character position against said representation, whereby processing a candidate character of said candidate string results in a next state and a probability value, said match is deemed achieved when a given next state associated with a given candidate character of said plurality of characters computed during said applying is said success state of said representation and said probability value associated with said given next state is above said predetermined matching threshold.

2. The method of claim 1 wherein said processing said candidate character includes ascertaining said next state based on a preceding state and said candidate character and ascertaining said probability value associated with said next state.

3. The method of claim 2 wherein said ascertaining said probability value includes multiplying a recognition probability associated with said candidate character with a probability associated with said preceding state.

4. The method of claim 2 wherein a given character position of said candidate string of characters includes a first candidate character and a second candidate character, said ascertaining said probability value associated with said next state includes processing said first candidate character and said second candidate character against said representation.

5. The method of claim 1 wherein said processing said first candidate character and said second candidate character against said representation results in at least a first next state and a second next state.

6. The method of claim 1 wherein said next state is said first state if there exists no valid next state for said candidate character from a preceding state according to said representation.

7. The method of claim 1 wherein said generating said candidate string of characters from said image-form textual string includes forming character blocks from said image-form textual string and performing character recognition on said character blocks.

8. The method of claim 7 wherein said generating said candidate string of characters from said image-form textual string further includes calculating recognition probabilities associated with candidate characters recognized from said character blocks.

9. The method of claim 8 wherein said calculating said recognition probabilities includes employing a support vector machine (SVM) approach.

10. The method of claim 1 wherein said representation is a deterministic finite state automaton (DFSA) representation.

11. An article of manufacture comprising a non-transitory program storage medium having computer readable codes embodied therein, said computer readable codes being configured for matching an image-form textual string in an image to a regular expression, comprising:
    computer readable code for constructing a representation of said regular expression;
    computer readable code for generating a candidate string of characters from said image-form textual string;
    computer readable code for ascertaining whether there exists a match between said image-form textual string and said regular expression, said match is deemed achieved if a probability value associated with said match is above a predetermined matching threshold; and
    said representation has at least a first state representing uncertainty whether said image-form textual string matches said regular expression and a success state representing a successful match between said image-form textual string and said regular expression and wherein said candidate string of characters includes a plurality of candidate characters occupying a plurality of character positions, each candidate character of said plurality of candidate characters associated with a respective recognition probability and wherein said ascertaining includes applying said candidate string of characters character position-by-character position against said representation, whereby processing a candidate character of said candidate string results in a next state and a probability value, said match is achieved when a given next state associated with a given candidate character of said plurality of characters computed during said applying is said success state of said representation and said probability value associated with said given next state is above said predetermined matching threshold.

12. The article of manufacture of claim 11 wherein said processing said candidate character includes ascertaining said next state based on a preceding state and said candidate character and ascertaining said probability value associated with said next state.

13. The article of manufacture of claim 12 wherein said ascertaining said probability value includes multiplying a recognition probability associated with said candidate character with a probability associated with said preceding state.

14. The article of manufacture of claim 12 wherein a given character position of said candidate string of characters includes a first candidate character and a second candidate character, said ascertaining said probability value associated with said next state includes processing said first candidate character and said second candidate character against said representation.

15. The article of manufacture of claim 11 wherein said processing said first candidate character and said second candidate character against said representation results in at least a first next state and a second next state.

16. The article of manufacture of claim 11 wherein said next state is said first state if there exists no valid next state for said candidate character from a preceding state according to said representation.

17. The article of manufacture of claim 11 wherein said generating said candidate string of characters from said image-form textual string includes forming character blocks from said image-form textual string and performing character recognition on said character blocks.

18. The article of manufacture of claim 11 wherein said generating said candidate string of characters from said image-form textual string further includes calculating recognition probabilities associated with candidate characters recognized from said character blocks.

19. The article of manufacture of claim 18 wherein said calculating said recognition probabilities includes employing a support vector machine (SVM) approach.

* * * * *